UNITED STATES PATENT OFFICE.

JOHN D. CHEEVER, OF NEW YORK, N. Y.

WATER-PROOF AND PLASTIC COMPOSITION.

SPECIFICATION forming part of Letters Patent No. 254,462, dated March 7, 1882.

Application filed January 24, 1882. (Specimens.)

*To all whom it may concern:*

Be it known that I, JOHN D. CHEEVER, a citizen of the United States, residing at New York, in the county of New York and State of New York, have invented certain new and useful Improvements in Water-Proof and Plastic Compositions or Compounds, capable of being formed into sheets for various useful purposes; and I do hereby declare the following to be a full, clear, and exact description of the invention, such as will enable others skilled in the art to which it appertains to make and use the same.

I take of jute reduced to short fibers of an eighth to three-eighths of an inch in length, in any suitable mill, or those used for grinding woolen and other rags, for example, forty pounds; waste or spent tan-bark dried and ground to a fine powder, forty pounds; flour sulphur, seven and a half pounds, and thoroughly mix the whole together in a suitable mixing-mill. I next grind old waste vulcanized rubber to a fine powder and heat it in an iron retort with petroleum, or with what I prefer, the oily pasty product of petroleum, known as "vaseline," so named and described in the specification of patent dated June 4, 1872, No. 127,568, granted to Robert A. Cheesebrough. The rubber powder is heated until it becomes tacky and plastic, when sixty pounds of it are added to the mixture of powders above described. The mixture is accomplished by pounding in an iron mortar, and afterward more thoroughly by the mullers or masticators commonly employed for india-rubber manufacture. An addition of a small portion of coal-tar naphtha or petroleum-naphtha facilitates the labor of completing the mixture. The compound or mixture thus made is next calendered or spread into sheets by the steam-heated iron rolls commonly employed for such purposes. When intended for floor-coverings the sheets are spread on burlaps, a cloth so named made of jute, which has been prepared as described in the specification filed by me in the Patent Office bearing the date of this specification. The sheets so formed are exposed to an atmosphere of summer temperature for a day or two, when they acquire the firmness and some of the peculiarities of vulcanized-rubber compounds.

The sheets may be varnished, painted, and printed in any desired patterns and colors in the usual manner practiced in like cases.

The proportions I have named may be somewhat varied, but they are such as I have found afford the best results.

Having thus described my invention, what I claim, and desire to secure by Letters Patent of the United States, is—

1. The composition herein described, consisting of jute, waste rubber rendered plastic by means of vaseline, or equivalent product of petroleum and sulphur, the whole treated substantially as described.

2. Jute, in combination with old waste vulcanized rubber which has been made plastic, as described.

3. The combining of powdered bark, with or without jute, with old waste rubber which has been made plastic by the process described.

4. The method of converting old waste rubber into a plastic condition by the use of vaseline, as set forth.

In testimony whereof I affix my signature in presence of two witnesses.

JOHN D. CHEEVER.

Witnesses:
  VICTOR E. BURKE,
  ALFRED R. PAGE.